(12) United States Patent
Scofield

(10) Patent No.: US 9,601,009 B2
(45) Date of Patent: Mar. 21, 2017

(54) TRAFFIC CAUSALITY

(71) Applicant: INRIX, Inc., Kirkland, WA (US)

(72) Inventor: Christopher L. Scofield, Seattle, WA (US)

(73) Assignee: INRIX INC., Kirkland, WA (US)

(*) Notice: Subject to any disclaimer, the term of this patent is extended or adjusted under 35 U.S.C. 154(b) by 0 days.

(21) Appl. No.: 14/626,315

(22) Filed: Feb. 19, 2015

(65) Prior Publication Data

US 2015/0170512 A1    Jun. 18, 2015

Related U.S. Application Data

(63) Continuation of application No. 13/839,039, filed on Mar. 15, 2013.

(51) Int. Cl.
| | |
|---|---|
| *G01C 21/34* | (2006.01) |
| *G08G 1/00* | (2006.01) |
| *G08G 1/01* | (2006.01) |
| *G08G 1/0967* | (2006.01) |

(52) U.S. Cl.
CPC ........... *G08G 1/00* (2013.01); *G01C 21/3492* (2013.01); *G08G 1/0129* (2013.01); *G08G 1/0133* (2013.01); *G08G 1/0141* (2013.01); *G08G 1/096741* (2013.01); *G08G 1/096775* (2013.01)

(58) Field of Classification Search
CPC ............. G01C 21/3492; G08G 1/0129; G08G 1/096775; G08G 1/0141; G08G 1/096741; G08G 1/0133
See application file for complete search history.

(56) References Cited

U.S. PATENT DOCUMENTS

| | | | |
|---|---|---|---|
| 2002/0128751 A1 | 9/2002 | Engstrom et al. | |
| 2006/0058940 A1 | 3/2006 | Kumagai et al. | |
| 2008/0071465 A1 | 3/2008 | Chapman et al. | |
| 2009/0105932 A1* | 4/2009 | Choi | 701/117 |

(Continued)

FOREIGN PATENT DOCUMENTS

EP    1657693 A2    5/2006

OTHER PUBLICATIONS

Int. Search Report cited in PCT Application No. PCT/US2014/022546 dated Jul. 30, 2014, 12 pgs.

(Continued)

*Primary Examiner* — Yuen Wong
(74) *Attorney, Agent, or Firm* — Cooper Legal Group, LLC

(57) ABSTRACT

One or more techniques and/or systems for providing congestion information for a road segment presently experiencing traffic congestion and/or likely to experience traffic congestion in the future are provided. In some embodiments, traffic models are configured to determine road segments where traffic congestion is likely to occur, to determine a cause of traffic congestion, and/or to determine the effect of such traffic congestion (e.g., the duration of such traffic congestion, the expected time delays due to such traffic congestion, etc.). Congestion information indicative of the cause of congestion and/or the effect(s) of such traffic congestion, for example, may be provided to a user to explain to the user why the congestion is occurring, to describe one or more road segments to avoid, and/or to explain why a particular route was selected as a preferred route to a destination, for example.

19 Claims, 6 Drawing Sheets

(56) References Cited

U.S. PATENT DOCUMENTS

2010/0077017 A1\* 3/2010 Martinez et al. ............ 709/201
2011/0043377 A1 2/2011 McGrath et al.

OTHER PUBLICATIONS

EP Communication cited in EP Application No. 14 725 254.8 dated Nov. 9, 2016, 3 pgs.
Reply EP Communication cited in EP Application No. 14 725 254.8 dated Feb. 2, 2017, 10 pgs.

\* cited by examiner

TRAFFIC CAUSALITY

RELATED APPLICATIONS

This application is a continuation of and claims priority to U.S. patent application Ser. No. 13/839,039, titled "TRAFFIC CAUSALITY" and filed on Mar. 15, 2013, which is incorporated herein by reference.

BACKGROUND

Numerous factors can contribute to traffic congestion and impact travel times, such as time-of-day, local concert events, weather, road constructions, accidents, etc. Such congestion frequently leads users (e.g., drivers) to become frustrated and to seek alternate routes without information regarding the cause of the traffic congestion. In some cases, a user may reroute his/her vehicle to an alternate route only to discover the alternate route is also congested.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques are described herein for communicating congestion information regarding traffic congestion to a user. The congestion information describes one or more causes of present traffic congestion and/or expected future traffic congestion along a road segment and may provide other details that assist the user in evaluating alternatives to reduce the impact of the traffic congestion on a user's commute. For example, the congestion information may describe the expected wait time (e.g., how long it will be until the congestion has dissipated and/or how long it will be until the user passes a cause of the congestion and thus resumes a more normal commute, etc.) and/or alternate routes the user may consider to avoid the congestion.

In some embodiments, one or more traffic models are utilized to forecast traffic congestion and/or to predict a cause of the traffic congestion. For example, a first traffic model may be configured to model traffic along one or more road segments based upon the time-of-day. A second traffic model may be configured to model traffic along one or more road segments based upon local events that are taking place (e.g., professional sporting events, concerts, etc.). Another traffic model may be configured to model traffic along one or more road segments given various accident scenarios, etc. By evaluating the outputs of these models, traffic congestion along one or more road segments can be forecasted and/or a cause(s) of the congestion may be predicted. Moreover, congestion information explaining the cause(s) (e.g., as determined from the modeling) may be provided to a user. In this way, the system can provide reasons that a particular route, set of roads, neighborhoods, etc. should be avoided and/or can provide reasons why a user is presently stuck in traffic, for example.

The following description and annexed drawings set forth certain illustrative aspects and implementations. These are indicative of but a few of the various ways in which one or more aspects may be employed. Other aspects, advantages, and/or novel features of the disclosure may become apparent from the following detailed description when considered in conjunction with the annexed drawings.

DETAILED DESCRIPTION

Figure 1:
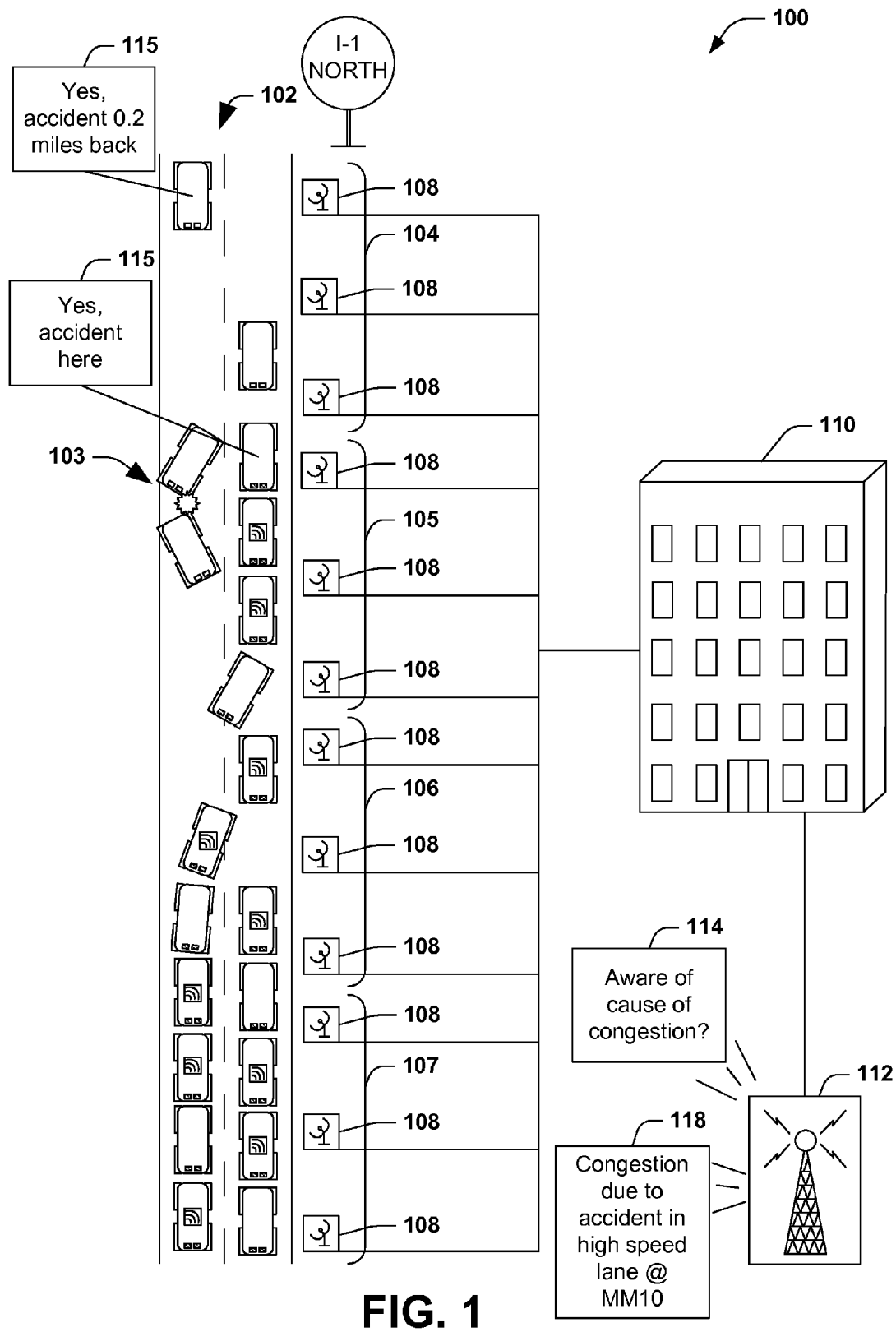
FIG. 1 illustrates an exemplary scenario for providing congestion information to a user.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Users often rely on navigation software to navigate the user from a starting location to an ending location. The navigation software typically evaluates various alternate routes between the starting location and the ending location to identify one or more preferred routes that more closely satisfy specified route criteria (e.g., relative to the remaining alternate routes). Typically, the one or more preferred routes are the temporally shortest routes (e.g., fastest route), although other route criteria may be designated for consideration (e.g., spatially shortest routes, temporally shortest routes that avoid toll roads, etc.).

It may be appreciated that due to, among other things, the time-of-day, accidents, weather, construction, road closures, local events at venues, etc., the estimated travel time along one or more road segments may fluctuate. In recent years, some navigation software has begun to recognize the dynamic nature of traffic congestion and to plan routes according to present traffic conditions and/or expected traffic conditions at the time of a commute. For example, the navigation software may be configured to receive real-time traffic data indicative of vehicle density, vehicle speed, or other measures of traffic congestion from one or more traffic sensors and to utilize such traffic data to estimate travel times along corresponding road segments and/or to utilize such traffic data when evaluating various alternate routes. As an example, the navigation software may forecast traffic congestion along one or more road segments (e.g., based upon the time-of-day), and evaluate the various alternate routes when consideration is given to estimated traffic congestion (e.g., and associated travel times). Accordingly, the navigation software may identify a first route as the preferred route if the user intends to make the commute at 2 pm and may identify a second route as the preferred route if the user intends to make the commute at 6 pm.

While navigation software has recently begun to take present traffic congestion and/or expected traffic congestion at the time of a commute into account when evaluating routes to identify a preferred route(s), the navigation software typically does not explain to the user why a particular route was selected as the preferred route. Moreover, if a user experiences congestion along a route, little to no information is typically provided to the user to explain the cause(s) of the traffic congestion and/or other details regarding the congestion (e.g., such as how long the user is expected to be in the congestion).

Accordingly, systems and/or techniques for providing a user with congestion information describing the cause(s) for traffic congestion along a road segment and/or other information pertinent to the traffic congestion are provided. By way of example, the congestion information can further provide a reason(s) why a particular route was selected and/or provide a reason(s) why a particular road segment should be avoided.

In some embodiments, in addition to providing a reason(s) for traffic congestion and/or for selecting a particular route(s) as the preferred route(s), the congestion information may include other information that assists the driver in making an informed decision regarding the route (e.g., to evaluate whether to turn around, to cancel plans, to take an alternate route, etc.). For example, the congestion information may include information regarding how long the traffic congestion is expected to last and/or may provide updates regarding the cause of the traffic congestion. As an example, the congestion information may include alternate routes that the user may consider and/or estimated travel times for such alternate routes. In this way, the user is informed about a situation along one or more road segments, which may reduce or alleviate frustration caused by the traffic congestion, for example.

Turning to FIG. 1, an exemplary scenario 100 where congestion information for a road segment may be provided to a user is described. In this exemplary scenario 100, some users that are operating vehicles on a road 102 may encounter traffic congestion. For example, users traveling along a first road segment 104 of the road 102 may encounter little to no traffic congestion (e.g., and be in free-flow) while users traveling along one or more other road segments 105-107 of the road 102 may encounter high levels traffic congestion. Such traffic congestion may occur due to high vehicle volumes along the one or more road segments 105-107 (e.g., such as experienced during rush hour and/or experienced due a local event, such as concert, football game, etc.), accidents, road construction, road hazards (e.g., a pothole, animal, debris, etc.) inclement weather, etc. In this exemplary scenario 100, an accident 103 in the high-speed lane of the road 102, proximate a second road segment 105, has created congestion that extends from the second road segment 105 through to a fourth road segment 107.

To monitor real-time (e.g., present) traffic congestion, the exemplary scenario comprises reporting devices 108 positioned along the road segments 104-107. Such reporting devices 108 may include, among other things, radar sensors, laser sensors, in-road electromagnetic sensors, and/or other sensors configured to measure a speed of vehicles, monitor vehicle headway (e.g., distance and/or time between vehicles passing a fixed point), and/or count a number of vehicles per unit time, for example. As an example, the reporting devices 108 may include video cameras or other multimedia sensors (e.g., configured to produce still images, audio files, etc.). Traffic data collected by such reporting devices may be provided to a traffic service 110 configured to estimate traffic congestion for respective road segments 104-107 of the road 102.

Alternatively or in addition, similar information may be collected via crowd sourcing techniques. For example, mobiles devices such as cellular telephones, tablets, laptops and/or in-vehicle units may comprise location sensing equipment (e.g., global positioning satellite (GPS) chips, accelerometers, cellular triangulation equipment, etc.) configured to detect a present state of the vehicle (e.g., location, speed of travel, etc.) and/or may comprise reporting equipment (e.g., data transceivers, voice transceivers, etc.) configured to report such information to the traffic service 110. Utilizing (e.g., with user permission) a network of such mobiles devices and/or in-vehicle units, the traffic service 110 may estimate traffic congestion on road segments where such mobile devices and/or vehicles are traveling. In this way, dedicated equipment positioned along the side of and/or within a road segment may not be required to collect such traffic data and/or traffic data provided by such equipment may be supplemented with traffic data yielded from mobile devices and/or in-vehicle units, for example.

In the exemplary scenario 100, the traffic service 110 is configured to determine a cause of congestion when the information provided by one or more of the reporting devices 108 indicates that the degree of traffic congestion exceeds a specified threshold (e.g., where vehicle speed, vehicle volume, vehicle density, and/or other measures of congestion may be utilized to estimate a degree of traffic congestion). By way of example, the accident 103 along the second road segment 105 may cause reporting devices 108 to indicate a 20% decrease in traffic speed along the second route segment 105, the third route segment 106, and the fourth route segment 107 (e.g., which may be indicative of moderate congestion).

In response to receiving an indication that traffic congestion has risen above a specified threshold, the traffic service 110 may seek to identify a possible cause(s) of the congestion and/or to determine other information about the cause(s) using various techniques. For example, in some embodiments, a crowd-sourcing technique may be utilized in which the traffic service 110 is in operable communication with one or more users via the users' mobile devices, vehicle units, etc. Such devices and/or units may intermittently provide location information indicative of the user's location to the traffic service 110 via a communication device 112, for example. When traffic above the specified threshold is identified along one or more road segment 105-107, the traffic service 110 may identify users within a desired geometric proximity of the congested road segment(s) 105-107 and may issue a request 114 to users for information regarding the congestion. For example, the traffic service 110 may determine that the traffic congestion starts proximate the second road segment 105, and thus may issue a request 114 to users within the second road segment and/or neighboring road segments 104, 106 asking users if they are aware of what might be causing the congestion. In response, one or more users who are visually able to identify the accident 103 may communicate back to the traffic service 110 information 115 regarding the accident 103, such as via the communication device 112. Such information 115 may include a location of the accident, number of vehicles involved in the accident, whether any lanes are blocked due to the accident, whether emergency personnel are at the accident, the severity of the accident, and/or other information from which the traffic service 110 may assess the likely length of the delay and/or expected magnitude of traffic congestion (e.g., for how many miles traffic is expected to be backed up due to the accident 103). In other embodiments, users may provide such information to the traffic service 110 without being prompted to do so (e.g., by the traffic service 110). In some such embodiments, the traffic service 110 may further receive the indication of congestion from the user (e.g., the user notifies the traffic service 110 of an accident, which may also include an indication that congestion is moderate due to the accident).

The traffic service 110 may alternatively or additionally utilize other methods to determine the cause of the traffic congestion. By way of example, the traffic service 110 may be configured to receive information from one or more data sources, such as associated with emergency services (e.g., local emergency dispatch centers; police agencies, etc.), towing companies, media outlets, social networking websites, etc. and to evaluate such information to determine a likely cause of the traffic congestion. By way of example, the traffic service 110 may be in operable communication with an entity that maintains a social networking website. When the traffic service 110 seeks to determine a cause of traffic congestion along the road 102, the traffic service 110 may communicate with the social networking website to determine whether any users in the vicinity of the second road segment 105 recently posted a message about the traffic congestion and/or about a potential cause of traffic congestion. The traffic service 110 may discover that a user recently posted a message (e.g., status update) describing a recent accident the user observed and the message is geo-tagged with a location proximate the second road segment 105. Based upon such information, the traffic service 110 may predict that an accident is the cause of such congestion.

The traffic service 110 may alternatively or additionally utilize one or more models to predict a cause of the congestion and/or to supplement the information received via crowd-sourcing and/or via the data sources. By way of example, a first model may be configured to forecast whether the time-of-day is causing traffic congestion along one or more of the road segments 104-108 (e.g., is it rush-hour, and, if so, is rush hour contributing to congestion). A second model may be configured to forecast whether present weather conditions are causing traffic congestion along one or more road segments 104-108. A third model may be configured to forecast whether a nearby event at a local venue is causing traffic congestion along one or more road segments 104-108. A fourth model may be configured to forecast how various traffic accident scenarios might affect traffic congestion (e.g., to determine whether a traffic accident is the likely cause). The traffic service 110 may be configured to evaluate the output of respective models to determine a likely cause of the traffic. By way of example, the probability that weather is the cause of traffic congestion along a road segment may be low (e.g., because it is presently sunny and warm) and the probability that an accident is the cause of traffic congestion along the road segment may be high. Accordingly, the traffic service 110 may predict that an accident is the most likely cause of the congestion.

Based upon the identification or prediction regarding a cause of the traffic congestion, the traffic service may publish congestion information 118 descriptive of the cause, such as via the communication device 112. Such congestion information may include a cause of the congestion (e.g., accident near mile marker 10), expected time delays due to the congestion, alternate routes to avoid the congestion, and/or other information that may be useful to users and/or route planners. By way of example, the congestion information may include a present status of the cause (e.g., the accident 103 is presently blocking the high speed lane, emergency personnel have arrived at the scene, the accident 103 has been moved to a shoulder of the road 102, etc.). Moreover, in some embodiments, the congestion information may be customized to a specific user. For example, the congestion information may include information about a spatial relationship (e.g., distance) between the user and the accident 103, may include information about how long the user is expected to be in the congestion, and/or may suggest alternate routes specific to the user (e.g., in order for the user to arrive at a desired destination).

Figure 2:
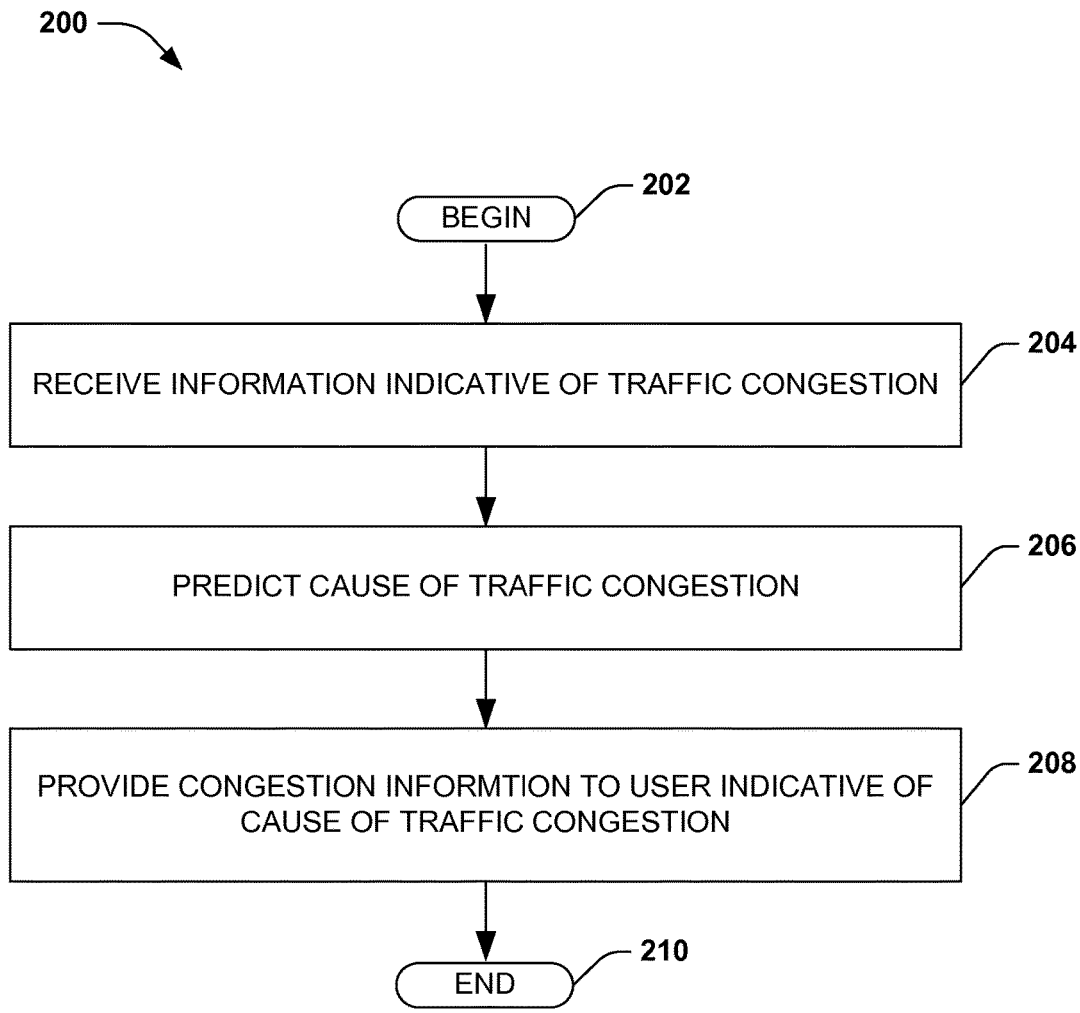
FIG. 2 illustrates a flow diagram of an example method for providing congestion information for a road segment.

FIG. 2 illustrates an example method 200 for providing congestion information for a road segment to a user. Such an example method 200 may be utilized to explain why a user is presently experiencing traffic congestion and/or may be utilized to explain why a particular route was selected by a route planner as a preferred route (e.g., instead of an alternate route which is usually selected by the route planner), for example.

The example method 200 begins at 202, and information indicative of traffic congestion is received at 204. The information may be provided from one or more of a plurality of sources, such as, for example, dedicated traffic sensors (e.g., configured to measure vehicle speed, vehicle headway, vehicle counts, etc. along one or more road segments), mobile devices associated with one or more users, sensors within vehicles, news media databases (e.g., detailing daily traffic congestion), social networking databases (e.g., where a user may post a message expressing frustration regarding congestion along one or more routes, etc.). Such information may include traffic data (e.g., indicative of vehicle speed, vehicle volume, vehicle density, etc.) and/or a notice regarding specific areas where traffic congestion is occurring. By way of example, the traffic service may receive a notice from a client device associated with a user. Such a notice may be indicative of the presence of traffic congestion along a road segment and request that the traffic service investigate a cause of the congestion, for example.

While reporting devices, such as dedicated traffic sensors, may provide information indicative of present traffic patterns and/or indicative of present traffic congestion, in some embodiment, the information received at 204 may be indicative of traffic congestion that is forecasted for some time in the future. By way of example, a concert may be expected to draw large crowds to a venue, which is expected to impact road segments spatially proximate to the venue. In some embodiments, one or more traffic models may be configured to receive information relating to a future event, such as the concert, and to forecast traffic patterns in view of the event. For example, a traffic model may forecast that in the hour leading up to the concert, road segments spatially proximate to the concert are expected to experience a degree of traffic congestion that exceeds a specified threshold (e.g., the concert is expected to impact travel times the one or more road segments). In such embodiments, information corresponding to such forecast may be provided at 204. In some embodiments, human operators may be responsible for estimating whether one or more road segments are likely to experience traffic congestion due to a future event and may be responsible for inputting such estimates into a map database. Accordingly, in such embodiments, the estimates and/or other information related to the estimates may be received at 204.

At 206 in the example method 200, a cause of the traffic congestion is predicted or determined. Such a cause(s) may include road hazards, accidents, construction, weather-related road conditions, events at local venues (e.g., sporting events, concerts, conferences, parades, etc.), etc. (at times collectively referred to generically as events).

Various techniques may be devised to predict or determine a cause of traffic. By way of example, where the traffic congestion was forecasted by a model, the model may further provide an explanation for the forecasted traffic congestion. By way of example, the model may indicate that the forecasted congestion is due to a local sporting event, due to rush hour, due to a road closure, etc. and/or due to the combination of two or more events (e.g., the traffic congestion is due to increased traffic volume caused by rush hour occurring at the same time as attendees are arriving to a concert). Likewise, where a human operator forecasted that traffic congestion was likely to occur along one or more road segments, the human operator may further provide an indication as to why the traffic congestion is likely to occur. Accordingly, the prediction may be the result of information provided by the model and/or the human operation.

In some embodiments where the prediction is reactionary (e.g., the traffic congestion has already occurred and the traffic service is attempting to understand why), other and/or supplemental techniques may be utilized to predict a cause of traffic. By way of example, the traffic service may be configured to receive input from one or more users offering explanations for the congestion and/or explaining events that the user has experienced. By way of example, respective users of the traffic service may load an application corresponding to the traffic service onto a mobile device. Such an application may include a report feature that facilitates users reporting congestion and/or reporting potential causes of congestion. By way of example, users may be able to use the report feature to report accidents, road hazards, construction, or other events along one or more road segments. As an example, users may be able to upload multimedia files (e.g., photos of an accident or other event) to the traffic service. The traffic service may then correlate such reports and/or files to locations where traffic congestion has been experienced to predict the cause of the traffic congestion.

In some embodiments, the cause of traffic may be predicted manually or programmatically based upon information provided from one or more data sources. By way of example, human operators may be responsible for reviewing data provided by emergency services, news outlets, government agencies, local venues, social media outlets, etc. and responsible for predicting/determining a cause of present traffic congestion based upon such a review. As an example, a human operator may monitor audio transmission of emergency services, transportation officials, and/or vehicle assistance providers (e.g., good-Samaritan vehicles, tow companies, etc.) to identify potential causes of traffic congestion along one or more road segments. As another example, the human operator may review social media websites and/or websites of media outlets to determine whether information is being posted to such websites that may indicate the cause of the traffic. As another example, websites of one or more venues may be reviewed by a human operator to determine whether a major concert, sporting event, performance, etc. is likely the cause of the traffic congestion.

Predictions made by a human operator may be entered into a map database which describes the location of the event (e.g., accident, road hazard, sporting event, etc.) and/or other information pertaining to the event (e.g., such as when the congestion is expected to dissipate, a present state of the event (e.g., an accident is blocking a lane of traffic, emergency officials have shut down a road segment, the accident has been moved to the shoulder, etc.)) that may be useful to users presently stuck in the traffic congestion and/or users who are being provided alternate routes due to traffic congestion, for example.

In some embodiments, the cause of traffic may be predicted programmatically. For example, programs may be developed that are configured to perform the foregoing tasks of human operators. A web crawler, for example, may be designed to crawl webpages associated with an emergency service, a media outlet, a government traffic agency, event venues, social media services, etc. to identify keywords that may be useful for predicting the cause of the traffic congestion. As an example, event schedules posted to a webpage associated with an event venue and/or a ticketing service may be crawled to determine if any local concert event or sporting event are occurring that may be impacting traffic volumes and/or traffic congestion. As another example, social media webpages may be crawled to determine if one or more users are posting messages geo-tagged at a location proximate the congestion and/or describing an event (e.g., accident, road hazard, etc.) that may contribute to traffic congestion.

In some embodiments, one or more models may be used to predict the cause of the traffic congestion. By way of example, as will be further described with respect to FIG. 3, various traffic models may be devised for predicting traffic congestion or for predicting expected traffic patterns when provided a set of input conditions, where the set of input conditions to a first model may be different than a set of input conditions to a second model, for example. By way of example, a first traffic model may be configured to receive historical traffic data and may be configured to develop an algorithm that correlates traffic patterns indicated in the historical traffic data with time-of-day, day-of-week, day-of-year, etc. In this way, the first traffic model can develop an algorithm that forecasts whether the time-of-day has an impact on traffic congestion for one or more road segments (e.g., and determine whether traffic congestion is routine on the stretch of the road segment at a particular time of day). A second traffic model may be configured to receive historical traffic data and event schedules to develop an algorithm that forecasts whether local events at a venue may be impacting traffic congestion. A third traffic model may be configured to receive historical traffic data and historical accident data to develop an algorithm that forecasts whether one or more accident scenarios would likely impact traffic congestion. A fourth traffic model may be configured to receive historical traffic data and historical weather data to develop an algorithm that forecasts whether present weather conditions or future weather conditions are likely to have an impact on traffic congestion, etc.

Using such forecasts and present traffic data, a prediction may be made regarding the cause of the traffic congestion. By way of example, the traffic model that takes into consideration weather may indicate that there is a high probability that present weather conditions are increasing traffic congestion. Accordingly, present weather conditions along the road segment may be predicted as the cause of the traffic congestion. As another example, the traffic model that takes into consideration local events may indicate that there is a high probability that a profession baseball game at a nearby stadium is increasing traffic congestion. As such, the traffic congestion may be attributed to the baseball game. In some embodiments, the traffic congestion may be predicted to be the cause of multiple events occurring concurrently. By way of example, no one event (or model) may explain the traffic congestion that is being experienced along the road segment (e.g., as determined based upon the traffic data). However, the combination of multiple events (e.g., such as a rush hour event in combination with an accident) and/or the combination of the output of models pertaining to such events may explain such traffic congestion. Thus, the rush hour event and the accident, in combination, may be predicted as the cause of the event, for example.

At 208 in the example method 200, congestion information indicative of the cause of the traffic congestion is provided to the user, such as via one or more client devices associated with a user(s). Such client devices may include, among other things, cellular telephones, tablets, laptops, in-head vehicle units (e.g., display systems mounted inside a vehicle), vehicle dashboard or windshield displays, eyewear, other wearable intelligent, computing, display, etc. devices (e.g., watches, jewelry, etc.), etc. configured to provide such congestion information visually, tactually, and/or aurally, for example.

In some embodiments, such congestion information may be provided in conjunction with an update to an estimated time of arrival, an update to a preferred route, and/or as part of the selection of the preferred route (e.g., where the present or forecasted traffic congestion affected the selection of the preferred route and/or the estimated time of arrival for the preferred route). By way of example, a route planner may be configured to consider present and/or forecasted traffic congestion when selecting a preferred route. If the preferred route is selected due in part to the present and/or forecasted traffic congestion (e.g., and a different route would have been selected but for the traffic congestion), the route planner may be further configured to provide the congestion information to the user explaining why the preferred route was chosen. For example, the route planner may explain to the user that an event scheduled to take place in 2 hours is likely to increase travel times along a road segment and/or may explain that the preferred route was selected to avoid the road segment. As another example, a route planner may recognize that the user is traveling slower than expected and may update the estimated time of arrival to reflect the slower travel. The route planner may also provide the user with congestion information explaining to the user why the user may be traveling at the slower rate of speed. For example, the route planner may explain to the user that an accident two miles ahead is causing the traffic congestion and reducing vehicle speeds along the road segment.

In some embodiments, the congestion information may be provided to the user independently of whether the user is presently using a route planner to route the user. By way of example, a traffic service may be configured to receive periodic and/or intermittent updates from a client device regarding the user's present location. Based upon such updates, the traffic service may determine that the user is approaching the traffic congestion and/or experiencing the traffic congestion and may provide the congestion information to the user in response to such a determination (e.g., which may be provided via an in-app messaging service, SMS-based messaging service, voice communication, etc.). In some embodiments, congestion information may be provided to users that are known to travel the road segment when the congestion is occurring and/or users that have registered as being within a particular geographic region. In some embodiments, the congestion information may be provided upon request (e.g., a user may request information regarding traffic congestion along one or more road segments) and/or may be published to a webpage, for example, that users can access to view such congestion information.

The congestion information may also include other information related to the traffic congestions instead of and/or in addition to the cause(s) of the traffic congestion. By way of example, a length of time that an event ends, the length of time before such traffic congestion is expected to dissipate, an expected travel time along the road segment, an expected time delay along the road segment, and/or a present status or condition of the event may be indicated in the congestion information. By way of example, the congestion information may include information describing whether an accident is blocking any lanes of a road segment, whether emergency responders are on the scene, and/or the severity of the accident. As an example, the congestion information may include multimedia files related to the event. For example, a user near the accident may take a photo of the accident and upload it to the traffic service and/or to a social networking website, and the congestion information may include the photo (e.g., so that other users can visualize the accident or other event). As another example, the congestion information may include links to news media outlets and/or forums (e.g., such as social media webpages) where users are discussing the traffic congestion and/or the event. As another example, one or more traffic models may be configured to forecast when the traffic congestion is expected to dissipate (e.g., to free-flow) and/or be reduced, and such a forecast may be included in the provided congestion information.

In some embodiments, the provided congestion information may be user specific (e.g., customized to the user). For example, the congestion information may describe how long it is expected to be before the user breaks free from the traffic congestion and/or may describe a spatial relationship between the user and the event that is causing the traffic congestion (e.g., the accident is 2 miles ahead or the user is expected to break free from the congestion in 1 mile). As another example, the congestion information may include one or more alternate routes the user may consider taking to break free of the traffic congestion, to avoid the traffic congestion, and/or to reduce estimated travel time to a destination in view of the traffic congestion, for example.

The example method 200 ends at 210.

Figure 3:
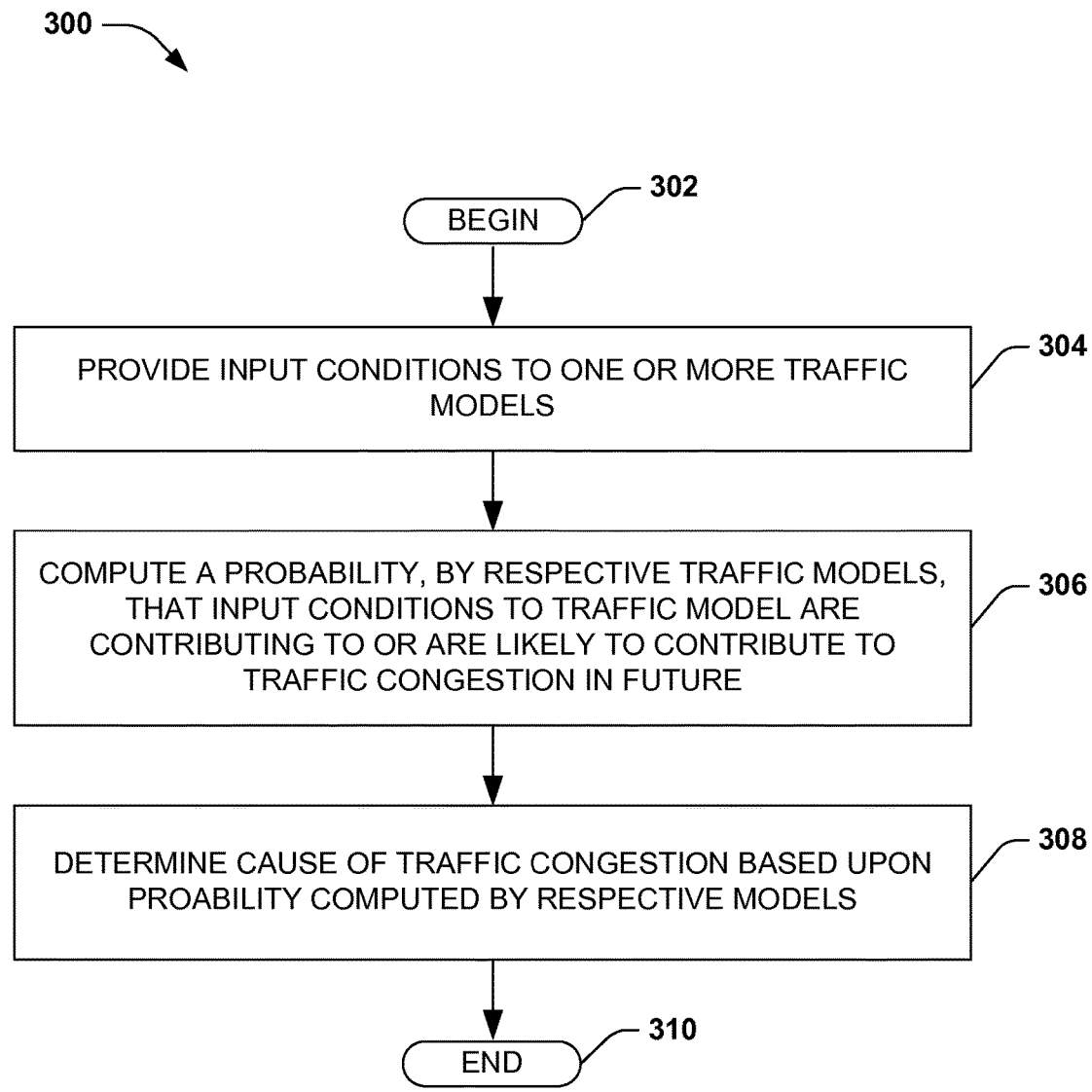
FIG. 3 illustrates a flow diagram of an example method for determining a cause of traffic congestion.

FIG. 3 illustrates an example method 300 which may be used to predict a cause of traffic congestion (e.g., at 202 in the example method). For example, the example method 300 describes a technique for evaluating one or more traffic models to predict the cause of traffic congestion. Such a method 300 may find particular application when traffic data indicative of the congestion is available to which the results of one or more traffic models can be compared. Although it may also find applicability in instances where no such traffic data is available. By way of example, it may be known that traffic congestion is present (e.g., but the extent of such traffic congestion may be unknown). If merely one traffic model and/or a small group of models are forecasting traffic congestion (e.g., while other models forecast substantially free-flow along a road segment), a cause of the traffic congestion may be predicted based upon which traffic model(s) is forecasting traffic congestion, for example.

The example method 300 begins at 302, and input conditions are provided to one or more traffic models at 304. At 306, respective traffic models are configured to compute a probability that the input conditions provided to the traffic model are contributing or are likely to contribute to traffic congestion in the future. By way of example, a first model may be configured to compute a probability that traffic congestion is likely to occur due to the time-of-day (e.g., where time-of-day may be the input condition for the first model). A second model may be configured to compute a probability that traffic congestion is likely to occur due to weather conditions (e.g., where a weather forecast and/or present weather data may be the input condition(s) for the second model). A third model may be configured to compute a probability that traffic congestion is likely to occur due to local events at one or more venues (e.g., where event schedules, ticket sales, or other information about a local event may be the input condition(s) for the third model). A fourth model may be configured to compute a probability that traffic congestion is likely to occur due to road construction (e.g., where road construction data, such as provided by a traffic authority, may be the input condition(s) for the fourth model). A fifth model may be configured to compute a probability that traffic congestion is likely to occur due to possible accidents (e.g., where various accident scenarios may be the input condition(s) for the fifth model). Other models may receive other input conditions, such as road hazard scenarios, and/or a combination of input conditions provided to one or more other models (e.g., such as time-of-day and event schedules), for example.

At 308, a cause of the traffic congestion is determined based upon the probability computed by respective models. In some embodiments, such a determination is made using an absolute threshold. For example, events associated with traffic models that output a probability of 80% of more may be determined to be the likely cause of present or future traffic congestion (e.g., where one or more events may be determined to concurrently contribute to traffic congestion). By way of example, a traffic model may be configured to compute a probability that a conference at a venue is contributing to traffic congestion (e.g., where the conference is the event associated with the traffic model). The traffic model may forecast that there is a 90% probability of traffic congestion along a road segment due to the conference. Accordingly, the conference may be identified at 308 as the cause of the example.

In other embodiments, such a determination is made using a relative threshold. For example, an event associated with a traffic model that outputs the highest probability may be determined to be the likely cause of present or future traffic congestion.

In still other embodiments, other approaches may be used to determine the cause of traffic congestion based upon the probability computed by respective models. For example, a set of rules may be devised that provides that if no probability exceeds a specified threshold, events associated with the two traffic models that output the two highest probabilities are identified as both contributing to the traffic congestion. As another example, a set of rules may be devised that provides that events associated with traffic models that output probabilities that are within a specified deviation of the highest probability are grouped with the event associated with the traffic model having the highest probability as all contributing to the traffic congestion.

The example method 300 ends at 310.

Figure 4:
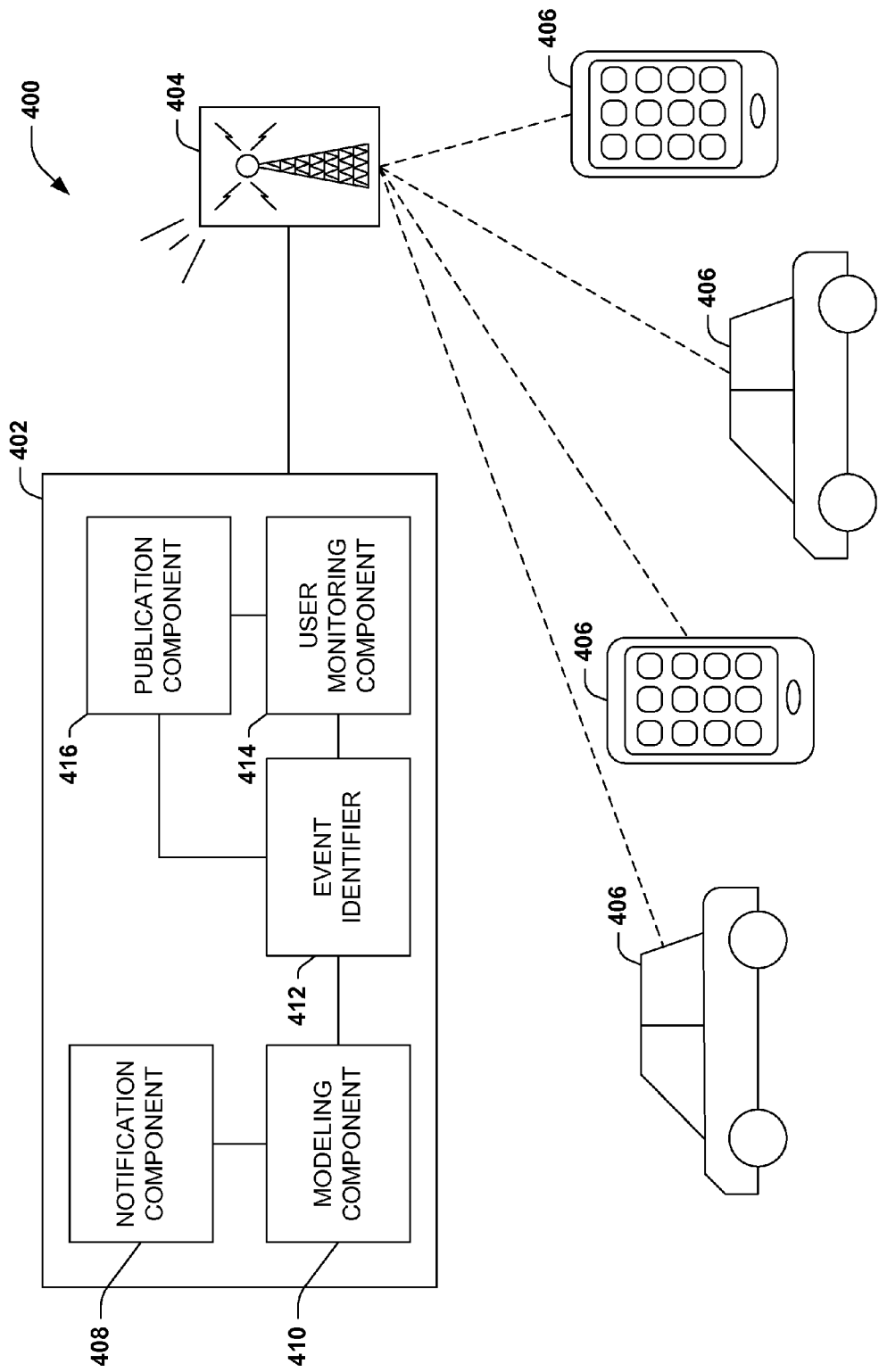
FIG. 4 illustrates an example environment for providing congestion information for a road segment to a user.

FIG. 4 illustrates an example environment 400 for providing congestion information for a road segment to a user. More particularly, the example environment 400 illustrates a component block diagram of a system 402 (e.g., such as a cloud-based system) for providing congestion information, which is operably coupled to a communication device 404 that facilitates communication between the system 402 and client devices 406 associated with one or more users. Such client devices 406 may include cellular telephones, tablets, laptops, in-head vehicle units (e.g., display systems mounted inside a vehicle), vehicle dashboard or windshield displays, eyewear, other wearable intelligent, computing, display, etc. devices (e.g., watches, jewelry, etc.), etc. configured to provide route information visually, tactually, and/or aurally, for example.

The example system 402 comprises a notification component 408, a modeling component 410, an event identifier 412, a user monitoring component 414, and a publication component 416. It is to be appreciated that while the example system 402 comprises the foregoing components, other systems may be devised that include other components and/or that do not include at least some of the foregoing components. By way of example, in some embodiments, the system may not comprise a user monitoring component 414 and/or a notification component 408. Also, one or more of the components and/or other components may be combined.

The notification component 408 is configured to receive traffic data and/or other information that indicates the possibility of traffic congestion along a road segment. By way of example, traffic data indicative of vehicle speeds, vehicle volume, and/or vehicle density along the road segment may be received from one or more reporting devices and used to estimate a degree of traffic congestion (if any). As an example, the system 402 may receive a notice or a report from a client device 406 (e.g., such as via the communication device 404) indicating that the user is presently experiencing traffic congestion. Using such traffic data, notices, and/or reports, the notification component 408 may be configured to identify a road segment where traffic congestion is presently occurring, for example.

The modeling component 410 is configured to develop traffic models for forecasting whether one or more events (e.g., a sporting event, accident, weather, etc. are likely cause traffic congestion. The purpose of developing such models may depend upon what information is known and what information is sought to be known. By way of example, in some embodiments, the presence of traffic congestion along a road segment may be known while the cause of traffic congestion is unknown. According, the traffic models may forecast an extent to which traffic congestion is likely to occur given various event scenarios (e.g., various accident scenarios, present weather data, information known about local event occurring spatially proximate the road segment, various road hazard scenario, etc.) (e.g., such as described in the example method 300 of FIG. 3). One or more event scenarios may be predicted to be the most likely cause of the traffic congestion or contributing to traffic congestion.

In some embodiments, a cause of traffic congestion along a road segment may be known, and the traffic models may be developed to forecast the future behavior of such traffic congestion. By way of example, it may be known (e.g., based upon information collected from one or more data sources, reports from users, an identification of an event scenario, etc.) that road construction along the northbound side of a highway is creating the traffic congestion. Accordingly, such models may utilize the event (e.g., the road construction) as an input and may forecast a likely time delay due to the road construction, an estimated time when the traffic congestion will dissipate, and/or an expected magnitude of the congestion (e.g., how many miles of roadway are likely to be impacted due to the congestion), for example.

In some embodiments, a future event may be known and traffic models may be developed to forecast the impact of such an event of road segments (e.g., to forecast future traffic congestion). For example, it may be known that a baseball game is scheduled for tomorrow evening and one or more traffic models may be developed to identify a road segment(s) spatially proximate the stadium where traffic congestion is likely to occur due to the baseball game (e.g., so that users and/or route planning software can avoid the road segment(s) where traffic congestion is likely). Other information that can be derived from such forecast may include an estimated time delay along the road segment due to the sporting event, an estimated time when the traffic congestion will dissipate, and/or an expected magnitude of the congestion, for example.

The information output by the modeling component 410 may be used by the event identifier 412 to identify an event(s) that is likely causing traffic and/or may be used by the publication component 416 to provide the user with congestion information that may be useful to the user (e.g., such as a likely time delay due to the event, an estimated time when the traffic congestion will dissipate, etc.).

The event identifier 412 is configured to identify one or more events that are at least one of causing traffic congestion along a road segment or likely to cause traffic congestion along the road segment. In some embodiment, the event may be known and thus the identification is relatively straight-forward. For example, where future congestion is being predicted, the event may be known (e.g., and used by the traffic models to forecast traffic congestion). In some embodiments, the event may be unknown, and the event identifier 412 may use the output of the traffic models developed by the modeling component 410 to identify an event(s) that is likely to be causing the traffic congestion (e.g., as further described in the example method 300 of FIG. 3). In some embodiments, the event identifier 412 may be configured to receive information from various other sources (e.g., apart from the modeling component 410) to identify/predict an event(s) that is causing the traffic congestion. For example, the event identifier 412 may be configured to crawl social networking websites and/or news media outlet websites to collect data from which to make such an identification/prediction.

The user monitoring component 414 is configured to monitor a location of the user, or rather a location of a client device 406 associated with the user. By way of example, client devices 406 may upload location information and/or route information (e.g., descriptive of a route a user intends to travel) to the system 402 via the communication device 404. Using this information, the user monitoring component 414 can identify users that are located on a road segment experiencing traffic congestion, and/or that are expected to encounter traffic congestion during the route. In some embodiments, such user identifications can be provided to the publication component 416 so that the publication component 416 can target the congestion information to users that are likely to have an interest in such congestion information.

In some embodiments, where the location of an event(s) creating the congestion is known, the user monitoring component 414 may be further configured to determine a spatial relationship between the user and the event(s) (e.g., a distance between the user and the event(s)). In this way, the publication component 416 can customize the congestion information to respective users whose location information is known (e.g., the accident is 2 miles ahead of the user's location), for example.

The publication component 416 is configured to provide congestion information to a user indicative of one or more events presently causing traffic congestion and/or expected to cause traffic congestion in the near future. Such information may include a cause of the traffic congestion, an expected time delay due to the congestion, a location of an event causing the traffic congestion, information regarding when the traffic congestion is expected to dissipate, average speed of vehicles on the road segment when the traffic congestion is expected, multimedia files corresponding to the event (e.g., pictures or video of an accident or road hazard), etc.

Such congestion information may be communicated to the user through one or more client devices 406 via a data-transmission protocol, short messaging service protocol, voice protocol, etc. In some embodiments, such congestion information is displayed within a navigation application (e.g., configured to display routes to a user). In some embodiments, such congestion information may be delivered to the user as an email, a test message, a voice message, etc. In some embodiments, such congestion information may be accessible via a web-based browser (e.g., the user can navigate to a specified webpage to view such congestion information). Moreover, the congestion information may be communicated on-demand (e.g., when the user requests such information), may be communicated when a route is being planned or altered (e.g., the congestion information may be presented to explain why a particular was selected as the preferred route, to explain why an estimated travel time was increased, and/or to explain why a road segment is being avoided), and/or may be communicate when other specified criteria is met (e.g., the publication component 416 may be configured to push the congestion information to the user upon a determination that the user is in the vicinity of the traffic congestion and/or is intended to travel a road segment where traffic congestion is expected).

The congestion information may be presented to the user visually, aurally, and/or tactually and may be unstructured, semi-structured, or structured. By way of example, in some embodiments, the congestion information is displayed in a message having one or more fields into which various types of congestion information may be entered by the publication component 416. For example, a first field may include information about the cause of congestion, a second field may include information about an estimated time delay to the event, a third field may include multimedia data corresponding to the event (e.g., images or video of the event, etc.). As an example, the congestion information may be presented within a map, which may illustrate a location of an event that is presenting causing traffic congestion and/or likely to cause traffic congestion in the future and/or illustrate the impact such an event is having on traffic congestion and/or expected to have on traffic congestion.

In some embodiments where information about a user's location is known, such as in the example system 402 where the user monitoring component 414 is configured to monitor the user's movement, the congestion information may be customized to respective users. For example, the congestion information may describe the spatial relationship between the user and the event, may described an expected time delay to the user, and/or may describe when the user is expected to break-free from such traffic congestion. In some embodiments, the congestion information may be user non-descriptive (e.g., the congestion information may not be customized based upon a user's location and/or information known about individual users).

In some embodiments, the publication component 416 is further configured to periodically and/or intermittently update the congestion information and provided updated congestion information to the user. By way of example, the publication component 416, notification component 408, and/or other component of the system 402 may be configured to receive information indicative of a change in an event (e.g., an accident originally blocking the high speed lane has been moved to the berm). Upon receipt of such information, the publication component 416 may be configured to update the congestion information to indicate the change in the event and configured to provide the updated congestion information to the user(s) (e.g., to inform the user(s) that the vehicles involved in the accident have been moved). In this way, the publication component 416 is configured to update the user regarding a situation to keep the user informed of what is taking place (e.g., and possibly reduce the user's frustration if the user is involved in the traffic congestion).

Figure 5:
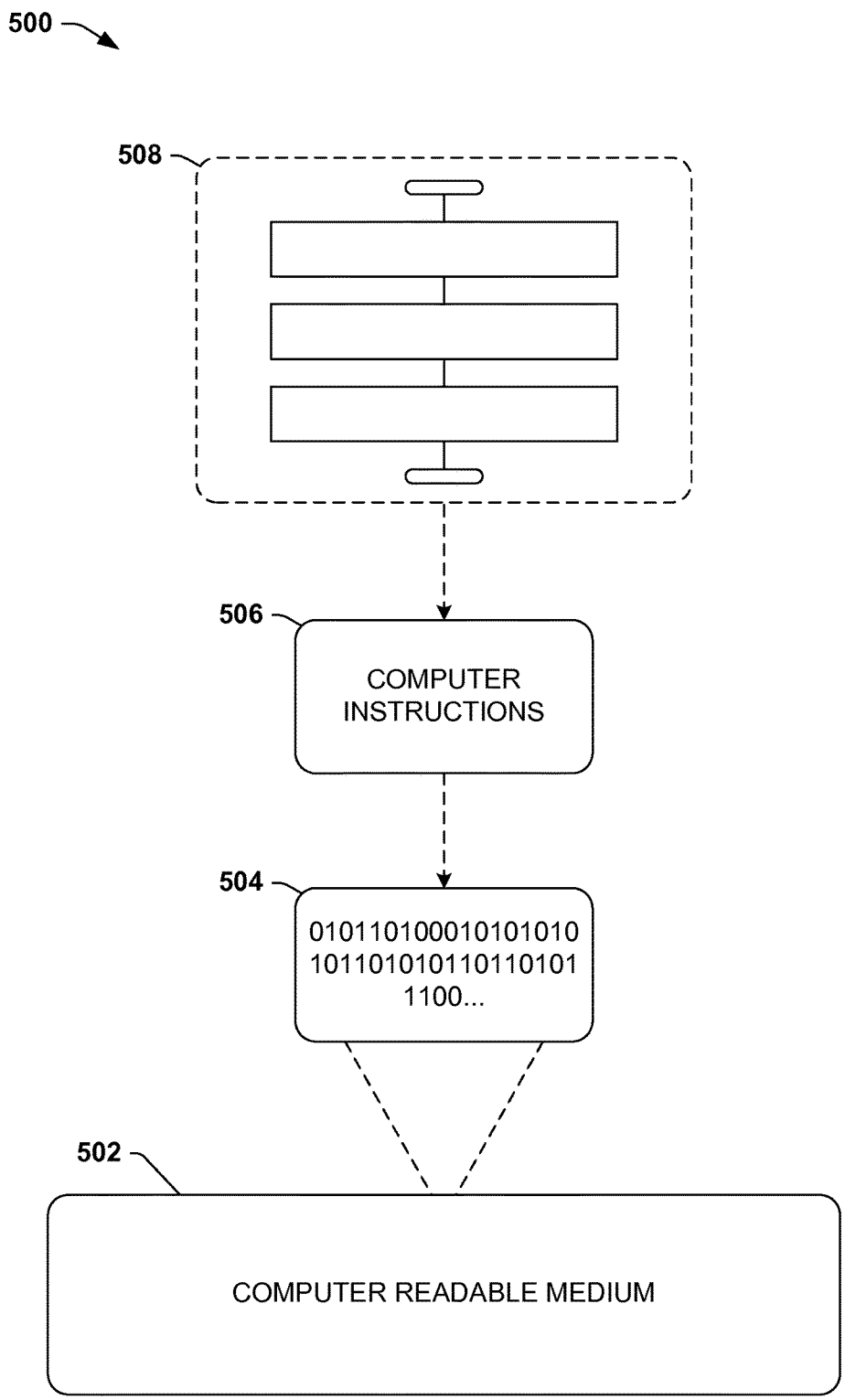
FIG. 5 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of processor-executable instructions 506 configured to be executed via a processing unit and/or configured to operate according to one or more of the principles set forth herein. In one such embodiment 500, the processor-executable computer instructions 506 may be configured to perform a method 508, such as at least some of the example method 200 of FIG. 2 and/or at least some of the example method 300 of FIG. 3, for example. In another such embodiment, the processor-executable instructions 506 may be configured to implement a system, such as at least some of the example environment 400 of FIG. 4, for example. Many such computer-readable media 502 may be devised by those of ordinary skill in the art that are configured to operate in accordance with the techniques presented herein.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 6:
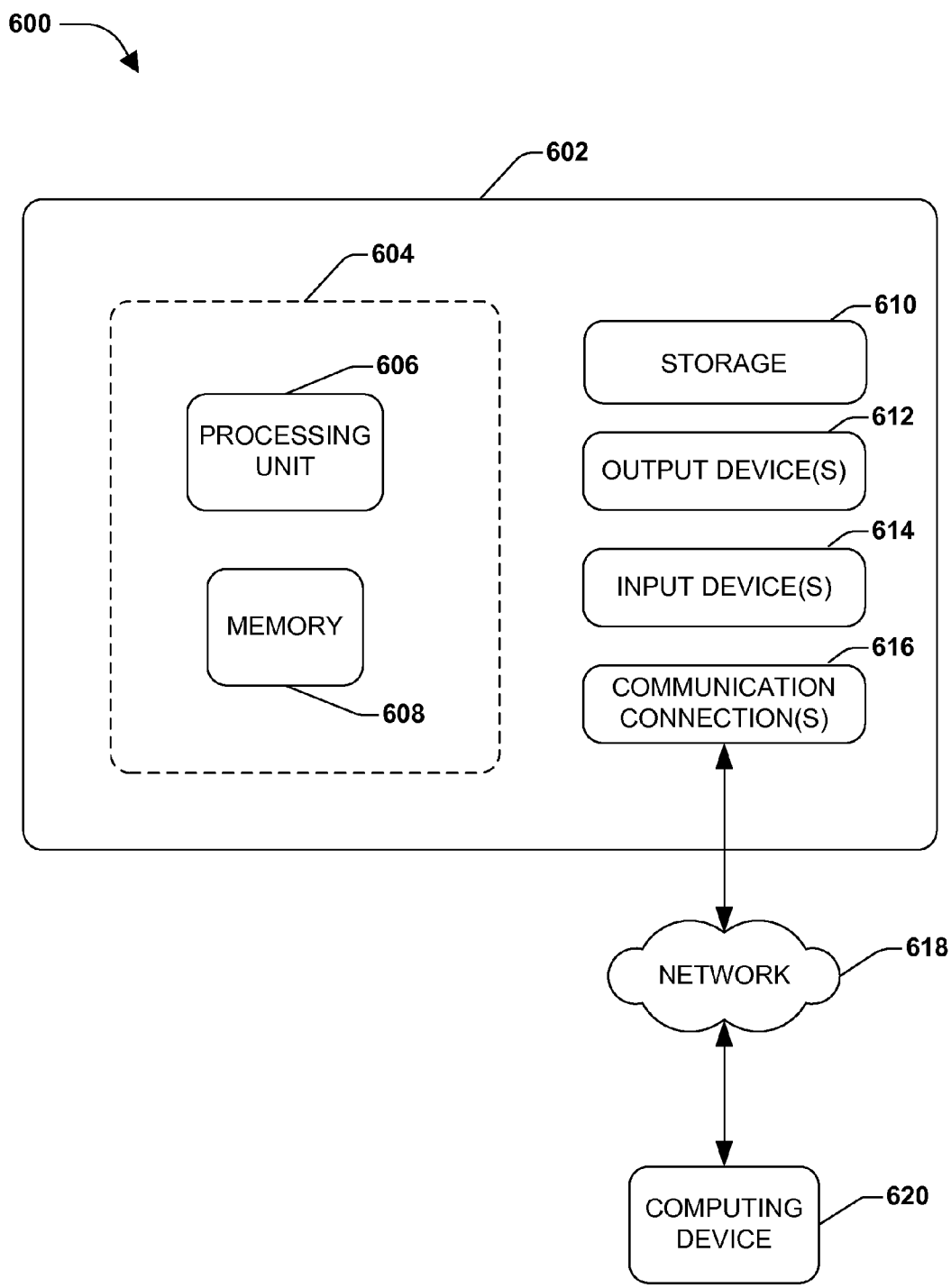
FIG. 6 illustrates an exemplary computing environment wherein one or more of the provisions set forth herein may be implemented.

FIG. 6 illustrates an example of a system 600 comprising a computing device 602 configured to implement one or more embodiments provided herein. In one configuration, computing device 602 includes at least one processing unit 606 and memory 608. Depending on the exact configuration and type of computing device, memory 608 may be volatile (such as RAM, for example), non-volatile (such as ROM, flash memory, etc., for example), or some combination of the two. This configuration is illustrated in FIG. 6 by dashed line 604.

In other embodiments, device 602 may include additional features and/or functionality. For example, device 602 may also include additional storage (e.g., removable and/or non-removable) including, but not limited to, magnetic storage, optical storage, and the like. Such additional storage is illustrated in FIG. 6 by storage 610. In an embodiment, computer readable instructions to implement one or more embodiments provided herein may be in storage 610. Storage 610 may also store other computer readable instructions to implement an operating system, an application program, and the like. Computer readable instructions may be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media may be part of device 602.

Device 602 may also include communication connection(s) 616 that allows device 602 to communicate with other devices. Communication connection(s) 616 may include, but is not limited to, a modem, a Network Interface Card (NIC), an integrated network interface, a radio frequency transmitter/receiver, an infrared port, a USB connection, or other interfaces for connecting computing device 602 to other computing devices. Communication connection(s) 616 may include a wired connection or a wireless connection. Communication connection(s) 616 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 602 may include input device(s) 614 such as keyboard, mouse, pen, voice input device, touch input device, infrared cameras, video input devices, and/or any other input device. Output device(s) 612 such as one or more displays, speakers, printers, and/or any other output device may also be included in device 602. Input device(s) 614 and output device(s) 612 may be connected to device 602 via a wired connection, wireless connection, or any combination thereof. In an embodiment, an input device or an output device from another computing device may be used as input device(s) 614 or output device(s) 612 for computing device 602.

Components of computing device 602 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 602 may be interconnected by a network. For example, memory 608 may be comprised of multiple physical memory units located in different physical locations interconnected by a network.

Those skilled in the art may realize that storage devices utilized to store computer readable instructions may be distributed across a network. For example, a computing device 620 accessible via a network 618 may store computer readable instructions to implement one or more embodiments provided herein. Computing device 602 may access computing device 620 and download a part or all of the computer readable instructions for execution. Alternatively, computing device 602 may download pieces of the computer readable instructions, as needed, or some instructions may be executed at computing device 602 and some at computing device 620.

Various operations of embodiments are provided herein. In an embodiment, one or more of the operations described may constitute computer readable instructions stored on one or more computer readable media, which if executed by a computing device, may cause the computing device to perform the operations described. The order in which some or all of the operations are described should not be construed as to imply that these operations are necessarily order dependent. Alternative ordering may be appreciated by one skilled in the art having the benefit of this description. Further, it may be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, and/or the same channel).

Although the disclosure has been shown and described with respect to one or more implementations, equivalent alterations and modifications may occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for identifying a possible cause of traffic congestion along a road segment, comprising:

providing a database that comprises a plurality of users and at least one of location information describing a location of each of the plurality of users or route information describing a route being traveled by each of the plurality of users; and upon detecting the traffic congestion along the road segment:

identifying, using the database, a user of the plurality of users who is within a specified geometric proximity of the road segment based upon the at least one of location information or route information regarding the user, wherein the at least one of location information or route information is periodically or intermittently provided to a traffic service and stored in the database;

issuing a request to the user, the request seeking information from the user about the possible cause of the traffic congestion;

receiving, responsive to the request, a notice from the user describing the possible cause of the traffic congestion;

predicting, by a processor, an effect of the possible cause of the traffic congestion on at least one of a duration of the traffic congestion or an expected time delay resulting from the traffic congestion; and distributing an alert to one or more other users of the plurality of users, wherein the alert presents and describes on a display or through a speaker the possible cause of the traffic congestion and the at least one of a duration of the traffic congestion or an expected time delay resulting from the traffic congestion.

2. The method of claim 1, wherein the notice received from the user comprises a multimedia file.

3. The method of claim 1, wherein the issuing the request comprises:
issuing the request to the user via a social media website comprising content associated with the user.

4. The method of claim 3, wherein the notice comprises content associated with the user and posted to the social media website.

5. The method of claim 3, wherein the notice comprises content associated with the user and posted to the social media website while the user is within the specified geometric proximity of the road segment.

6. The method of claim 3, wherein the notice comprises content associated with the user and posted to the social media website within a specified period of time of detecting the traffic congestion.

7. The method of claim 1, wherein the issuing the request comprises:
issuing the request to a device associated with the user.

8. The method of claim 1, comprising upon detecting traffic congestion along the road segment:
modeling the traffic congestion based upon the possible cause of the traffic congestion to generate a model of the traffic congestion.

9. The method of claim 8, comprising upon detecting traffic congestion along the road segment:
comparing the model of the traffic congestion to the traffic congestion to verify that the traffic congestion is attributable to the possible cause of the traffic congestion.

10. The method of claim 9, comprising upon detecting traffic congestion along the road segment:
modeling the traffic congestion based upon the possible cause of the traffic congestion and based upon one or more other possible causes of the traffic congestion responsive to the comparing indicating a degree of dissimilarity between the model of the traffic congestion and the traffic congestion exceeds a specified dissimilarity threshold.

11. The method of claim 10, wherein the one or more other possible causes of the traffic congestion are further predicted based upon one or more scheduled events within a second geometric proximity of the road segment.

12. The method of claim 10, wherein the one or more other possible causes of the traffic congestion are further predicted based upon a weather forecast for an area around the road segment.

13. A method for identifying a possible cause of traffic congestion along a road segment, comprising:
detecting the traffic congestion along the road segment;
issuing a request to a social media website for content comprising a specified set of keywords and posted by users within a specified geometric proximity of the road segment;
receiving, responsive to the request, a first set of content associated with one or more users within the specified geometric proximity of the road segment, wherein the first set of content comprises one or more keywords of the specified set and was posted to the social media website;
predicting, by a processor, an effect of the possible cause of the traffic congestion on at least one of a duration of the traffic congestion or an expected time delay resulting from the traffic congestion; and
distributing an alert to one or more other users, wherein the alert presents and describes on a display or through a speaker the possible cause of the traffic congestion and the at least one of a duration of the traffic congestion or an expected time delay resulting from the traffic congestion.

14. The method of claim 13, wherein the first set of content comprises content posted to the social media website within a specified period of time of the detecting traffic congestion.

15. The method of claim 13, wherein the first set of content comprises a multimedia file.

16. The method of claim 13, comprising modeling the traffic congestion based upon the first set of content to generate a model of the traffic congestion.

17. The method of claim 16, comprising comparing the model of the traffic congestion to the traffic congestion to verify that the traffic congestion is attributable to the possible cause of the traffic congestion.

18. A non-transitory computer readable storage device comprising processor executable instructions that when executed by a processor perform a method for identifying a possible cause of traffic congestion along a road segment, comprising:
providing a database that comprises a plurality of users and at least one of location information describing a location of each of the plurality of users or route information describing a route being traveled by each of the plurality of users; and
upon detecting the traffic congestion along the road segment:
identifying, using the database, a user of the plurality of users who is within a specified geometric proximity of the road segment based upon the at least one of location information or route information regarding the user, wherein the at least one of location information or route information is periodically or intermittently provided to a traffic service and stored in the database;
issuing a request to the user, the request seeking information from the user about the possible cause of the traffic congestion;
receiving, responsive to the request, a notice from the user describing the possible cause of the traffic congestion;
predicting, by a processor, an effect of the possible cause of the traffic congestion on at least one of a duration of the traffic congestion or an expected time delay resulting from the traffic congestion; and
distributing an alert to one or more other users of the plurality of users, wherein the alert presents and describes on a display or through a speaker the possible cause of the traffic congestion and the at least one of a duration of the traffic congestion or an expected time delay resulting from the traffic congestion.

19. The non-transitory computer readable storage device of claim 18, wherein the notice is received from the user and comprises a multimedia file.

* * * * *